(12) United States Patent
Hebenstreit et al.

(10) Patent No.: US 9,126,622 B2
(45) Date of Patent: Sep. 8, 2015

(54) STEERING ARRANGEMENT

(75) Inventors: Axel Hebenstreit, Stuttgart (DE);
Hans-Dieter Loeffler, Reutlingen (DE);
Thorsten Meyer, Wildberg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/237,289

(22) PCT Filed: Aug. 3, 2012

(86) PCT No.: PCT/EP2012/003318
§ 371 (c)(1),
(2), (4) Date: Apr. 21, 2014

(87) PCT Pub. No.: WO2013/020683
PCT Pub. Date: Feb. 14, 2013

(65) Prior Publication Data
US 2014/0241795 A1    Aug. 28, 2014

(30) Foreign Application Priority Data

Aug. 6, 2011    (DE) .......................... 10 2011 109 705

(51) Int. Cl.
*B62D 1/16*        (2006.01)
*B62D 1/20*        (2006.01)
(Continued)

(52) U.S. Cl.
CPC .. *B62D 1/16* (2013.01); *B62D 1/20* (2013.01);
*F16D 1/06* (2013.01); *F16D 1/0876* (2013.01);
*F16D 1/0882* (2013.01); *F16D 1/0888*
(2013.01); *F16D 3/387* (2013.01); *Y10T*
*403/7026* (2015.01)

(58) Field of Classification Search
USPC .................. 280/775, 777; 74/492; 403/359.1;
464/140, 162
See application file for complete search history.

(56) References Cited

U.S. PATENT DOCUMENTS 4,943,182 A      7/1990   Hoblingre
8,597,131 B2 *  12/2013   Pisinger ........................ 464/162
(Continued)

FOREIGN PATENT DOCUMENTS

DE    689 03 350 T2    3/1993
DE    100 12 322 A1    9/2000
(Continued)

OTHER PUBLICATIONS

International Search Report (PCT/ISA/210) with English translation dated Nov. 15, 2012 (Five (5) pages).
German Written Opinion (PCT/ISA/237) dated Nov. 15, 2012 (Seven (7) pages).
German Search Report with English translation dated Jul. 9, 2012 (Ten (10) pages).

*Primary Examiner* — Faye M Fleming
(74) *Attorney, Agent, or Firm* — Crowell & Moring LLP

(57) ABSTRACT

A steering arrangement includes a steering spindle and a steering coupling provided with a fork crown bearing a connecting element that connects an end of the steering spindle to the steering coupling in the form of a plug connection. To enable the combined steering spindle and steering coupling ends to be connected to each other in the correct relative position and thus to be able to prevent a defective assembly, the steering spindle end and the connecting element are coaxial plug partners on ends facing each other, by means of at least one tongue and groove guide element pair that provides a torque-transmitting priority control. The at least one groove and/or the at least one tongue of the guide element pair is molded on the interior of the shaft. A clamping device clamps the plug partners against each other in a plugging position so that they cannot come loose.

9 Claims, 7 Drawing Sheets

Figure 1:
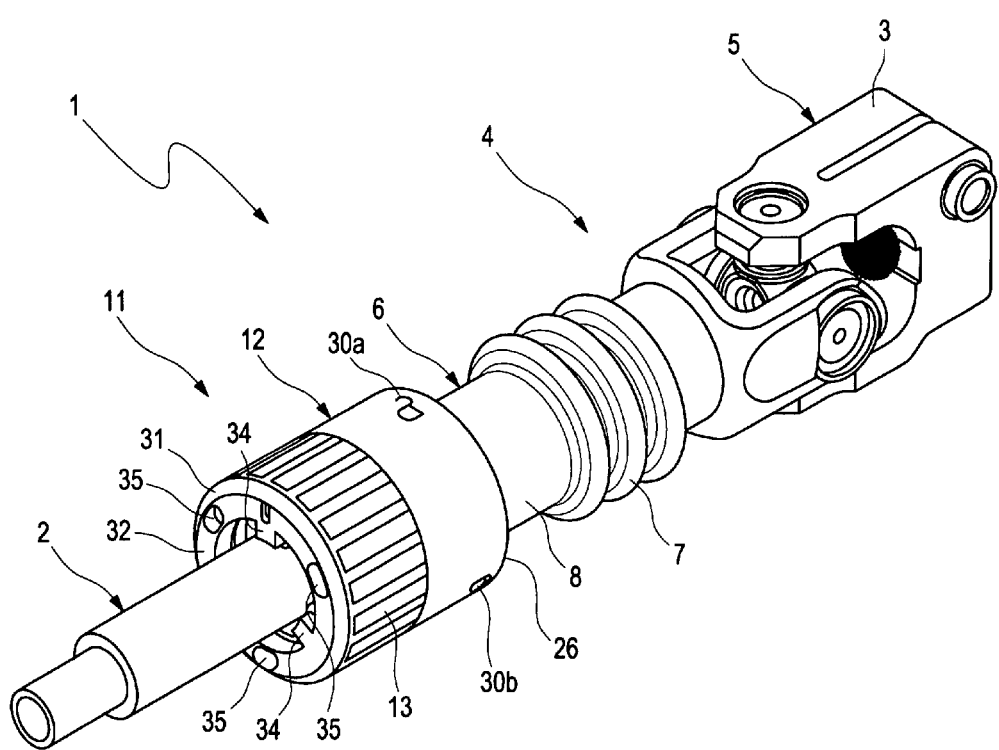

(51) Int. Cl.
*F16D 1/08* (2006.01)
*F16D 3/38* (2006.01)
*F16D 1/06* (2006.01)

(56) References Cited

U.S. PATENT DOCUMENTS

2003/0073502 A1* 4/2003 Barnley et al. ............... 464/162
2009/0124399 A1* 5/2009 Jung et al. .................... 464/162
2014/0205375 A1* 7/2014 Hebenstreit et al. ....... 403/374.2
2014/0246839 A1* 9/2014 Hebenstreit et al. ... 280/124.125

FOREIGN PATENT DOCUMENTS

| | | |
|---|---|---|
| DE | 102 39 202 A1 | 3/2004 |
| DE | 10 2008 006 497 A1 | 7/2009 |
| EP | 0 821 171 A1 | 1/1998 |
| JP | 10-205545 A | 8/1998 |
| WO | WO 2007/132133 A1 | 11/2007 |

* cited by examiner

STEERING ARRANGEMENT

BACKGROUND AND SUMMARY OF THE INVENTION

Exemplary embodiments of the present invention relate to a steering arrangement.

In existing steering direct screwing of the bottom of the steering spindle with the steering coupling is only possible in the combined field of exhaust gas assemblies, catalytic converters, engines and transmission lines with considerable effort. Here, the steering spindle is screwed in at the bottom with the steering coupling transverse to the steering spindle direction. This has the disadvantage of poor accessibility, and on the other hand the number of variants for optimizing the accessibility for different engine types and steering assemblies, for example left-hand and right-hand drive steering models, is increased, and, in addition, standard assembly sequences, such as the time of assembling the exhaust gas assembly, are hardly or not at all adhered to. Due to the poor accessibility, the screwing can only be carried out by the worker in a highly laborious manner, and takes up a large amount of assembly time. Here, the risk exists that the required screw will slip and be dropped by the worker, whereupon this must then be looked for and found for reasons of production safety. In this case, the assembly procedure is interrupted, which entails a considerable amount of time. In another approach, the steering coupling part is dispensed with and only the steering spindle at the bottom is used, wherein, however, a start-up of the engine in the Z direction during the final assembly, and thus the conflation of the pre-assembled engine/transmission and chassis unit, is, disadvantageously, not possible.

German patent document DE 10 2008 006 497 A1 describes an assembly arrangement for connecting a steering spindle to a steering coupling. The end piece of the steering spindle is inserted into an end receiving region of the steering coupling, wherein the assembly arrangement comprises a device for fundamentally achieving the coaxial alignment of the steering spindle and the steering coupling. This allows the automatic conflation of the steering spindle with the steering coupling, since a manual, coaxial alignment of the steering spindle and the steering coupling can be avoided. To that end, the steering spindle has a hooking element at the end, into which a strap loop protruding from the end receiving region of the steering coupling is mounted before the final assembly. By pulling on the loop of the strap, the hooking element, together with the end piece of the steering spindle, is inserted into the end receiving region of the steering coupling so as to be screwed in there.

Furthermore, German patent document DE 102 39 202 B4 discloses a connection between a steering shaft and a steering gear in a motor vehicle with a divisible joint, whereby the assembly and disassembly processes are simplified. To that end, the joint has an extension that can be fed, for assembly, through an opening in the footwell of the motor vehicle and which is equipped with protrusions, the joint can be inserted without rotation into a moveable cup-shaped or tulip-shaped receiver, which is located outside the footwell relative to the extension and which extends in the direction of the footwell. The joint is designed as a tripod joint, wherein the extension has a tripod head with three segments extending radially away from the extensions, the segments engaging with corresponding grooves of the receiver.

Due to the tight construction space conditions, the steering train normally impedes the assembly of the engine module with the body. In order to simplify the assembly of the engine module an intermediate piece, which connects the steering coupling to the end of the steering spindle, can be provided that enables this to be able to be swiveled away in the loose state, i.e. unscrewed, at the interface at which it is screwed in with the end of the steering spindle. The steering spindle can be pushed back to some extent in the steering wheel direction. After the assembly of the engine, the intermediate piece must be reconnected to the end of the steering spindle. This is extremely difficult for the assembler, since the construction space for a manual operation leaves hardly any clearance and the connection partners are very difficult to detect optically.

Exemplary embodiments of the invention are directed not only to simplifying the conflation of steering spindle end and steering coupling, but an arrangement that enables the conflated steering spindle and steering coupling ends to be connected to each other in the correct relative position and thus for a defective assembly to be prevented.

According to the invention, a steering arrangement contains a steering spindle and a steering coupling provided with a fork crown. The latter bears a connecting element, by means of which an end of the steering spindle is connected to the steering coupling in the form of a plug connection. The steering spindle end and the connecting element are formed as coaxial plug partners at ends facing each other, by means of a tongue and groove guide element pair, which provides a torque-transmitting priority control. Each plug partner, steering spindle end and connecting element thus has at least one groove or one corresponding tongue configured as a guide element. The connecting element is formed by a hollow shaft of the steering coupling, wherein the at least one groove and/or the at least one tongue of the guide element pair is molded onto the interior of the shaft. In addition, the steering arrangement contains a clamping device, by means of which the plug partners can be clamped against each other in a plugging position so that they cannot come loose.

Due to the guide elements according to the invention, which can be readily touched and/or seen by an assembler, the steering spindle and the connecting element of the coupling may, in an advantageously simpler manner, be combined, wherein they always assume the correct relative position to each other due to the pre-determined guiding as a result of the respective correspondence between groove and tongue. The clamping device connects the plug partners by means of contact pressure force in such a way that the plug connection is without clearance and an undesired release of the plug partners from the plugging position during the vehicle operation is prevented. The guide elements formed by tongue and groove extend solely along the steering spindle axle. Therefore, a clamp-free manageability of the plug partners, which is easy for the assembler to embody, is enabled for achieving the plug connection. It is possible, if required, to carry out the assembly by hand.

Due to the fact that the hollow shaft that already exists in the typical steering coupling, to which the fork crown connects, serves as a plug partner, additional components that provide guiding in a straight line can be dispensed with. The groove(s) and/or tongue(s) can be molded onto the hollow shaft in a simple manner.

The shaft is preferably designed as a casting or as a reshaped hollow profile, wherein both are connected unreleasably to the fork crown. This is, for example, achieved by means of a welded joint, in particular a laser-welded joint. The casting and hollow profile can preferably consist of metal, whereby the welded joint can be embodied in a simple manner. It is also conceivable for the casting to be an injection-molded part and to be injected onto the fork crown, should this permit torque transmission with operational safety. Due to the single-piece design of the welded joint, this can subsequently be surface-coated in its entirety. This was not possible in hitherto existing embodiments, wherein the functionality of the plug connection between tongue and groove was set in separate components.

The steering spindle and the connecting element preferably have several tongue and groove guide element pairs displaced towards the periphery, which are designed with different widths and/or are distributed asymmetrically over the periphery of the steering spindle and the connecting element. A clear allocation of the tongue/groove guide elements of the plug partners is hereby possible, such that a defined relative position of the steering spindle end and the connecting element with respect to each other is defined and no defective plug connection can take place during assembly. In the case of an asymmetrical arrangement, three respective grooves and tongues can preferably be arranged on the cylindrical exterior of the steering spindle end and the interior of the connecting element, which are positioned with 120° displacement to one another. The number of grooves can thus be greater than the number of tongues, such that, for each tongue of the connecting element, at least one groove is present on the steering spindle end. Naturally, it is generally also conceivable to provide the grooves in the connecting element and the tongues on the steering spindle end, or to arrange both on both plug partners interchangeably. With a plurality of grooves and tongues, the ability of the plug partners to transmit higher levels of torque is also improved.

The groove and tongue of the at least one tongue and groove guide element pair particularly preferably has a tapered shape, wherein the groove tapers in the longitudinal axial direction towards the side facing away from the plug partner, and the tongue tapers in the longitudinal axial direction towards the side facing the plug partner. When there is tension, the tapers are pulled against each other, whereby, due to the unfolding wedge clamping, a particularly strong positive fit is formed, which leads to a tight and stiff, clearance-free connection of both plug partners. The release protection of the plug partners is also improved by this positive fit. Moreover, clearance is prevented by the spring-loaded tapered joint, said clearance being able to arise when the plug partners wear out.

The shaft of the steering coupling particularly preferably bears the clamping device. This contains a locating sleeve, a pressure spring and a supporting ring. The supporting ring is connected tightly to the shaft of the steering coupling and is mounted coaxially on the end thereof. The connection advantageously takes place by an expansion of the hollow shaft, as a whole or locally. The metallic supporting ring here has recesses with which the hollow shaft can engage with protrusions and is positively wedged in the recesses, whereby a rotational movement and an axial movement of the supporting ring is prevented on the hollow shaft and a defined, fixed position on the shaft is adjusted. As a result of the radial expansion, an additional frictional connection between the shaft and the supporting ring is achieved, which further improves the durability of the supporting ring on the shaft. The pressure spring, preferably designed as a helical spring, lies on the side of the supporting ring facing away from the plugging direction of the steering spindle. The tension is achieved via the pressure spring. The locating sleeve engages behind the supporting ring and the pressure spring is moveably arranged on the shaft for rotation and displacement, wherein it possesses an axial stop on the pressure spring. The locating sleeve has, on the end facing away from the pressure spring, at least one projection pointing radially inwards or a groove that corresponds with the groove or with the tongue of the steering spindle end. Furthermore, an undercut is formed on the end of the steering spindle, which the at least one groove and/or the at least one tongue of the steering spindle end adjoins. The undercut can be a stepped ridge or an annular groove or even a rounded, conical tapering of the steering spindle end.

In order to advantageously achieve the tension, the locating sleeve is raised axially against the elastic force after the plug connection of both plug partners has been achieved, wherein, for example, the projection(s) slide(s) through the grooves of the steering spindle end until the undercut has been reached. After this, the sleeve can be rotated, whereupon the projection(s) can be placed behind a tongue of the steering spindle end by means of a rotation of the sleeve. The sleeve is then unclasped, whereupon it strikes the tongue(s) below with the projection(s). The pressure spring is released, pulling the plug partners together and thereby clamping them.

In a preferred embodiment, the locating sleeve has an annular collar arranged at the end, which extrudes inwards on the side facing away from the pressure spring, which encloses the supporting ring as a cover. The annular collar preferably has the width of the supporting ring and completely covers it. The at least one projection projects radially inwards from this annular collar. The annular collar furthermore has—with respect to its width when situated approximately in the center—at least one opening into which a pin is immersed, which is arranged on the front side of the supporting ring facing away from the pressure spring. The pin is arranged in the covered region of the supporting ring. The opening(s) on the annular collar is/are arranged with displacement in the peripheral direction to the projection or projections in such a way that, when there is immersion of the pin into the opening, the adjacent projection behind adjoins a tongue. In the case of three openings that are arranged with 120° displacement to one another, the adjacent projections are each displaced by 45° to these in the peripheral direction. When the sleeve is rotated, the pin(s) rise(s) on the interior of the annular collar until it/they is/are immersed into the opening. Then, it is not only guaranteed that the projection of the sleeve has struck behind a tongue of the steering spindle end, but also that the clamping is virtually locked by immersing the pin into the opening, i.e. a release-protected clamping is achieved and undesired disassembly is practically no longer possible. The opening and pin can be coordinated in such a way that their shape and dimensions correspond to each other, such that the pin is immersed into the opening in a defined manner and a direct positive fit, and thus a defined position of the pin, is provided in the opening. During immersion, the pressure spring is released yet further, which can be seen in a noticeable snap release that can be detected audibly and tactilely by the assembler.

The length of the pin is preferably not only such that it is immersed into the opening, but also such that it protrudes from the other end. The assembler can thus also haptically detect whether the assembly is complete. When the protruding pin is touched, the clamping is completely finished and the assembly process is concluded. In the case that, for whatever reason, it is necessary for a specific rotary position of the sleeve relative to the supporting ring to be included, it is conceivable for the pins and, accordingly, the openings, to have different shapes, such that a pin can be allocated to an opening precisely without there being any mispositioning.

The clamping device preferably contains a control ring, which adjoins the pressure spring opposite the supporting ring and which has at least one, preferably ramp-like, control contour on the front side facing away from the supporting ring, which the locating sleeve adjoins with a control cam.

The control ring has, on its inner periphery, at least one guiding pin, which engages with a guiding groove running axially on the outside of the shaft. The control ring is thus arranged without rotation and can only be moved axially, wherein one groove end with respect to the fork crown forms a stop for the control ring. With three guiding pins that are arranged with 120° displacement on the control ring and engage with one respective guiding groove allocated thereto, the control ring can be guided without tilting. In other words, the shaft accordingly has three guiding grooves, which are also arranged with 120° displacement to one another in the peripheral direction. In an advantageous manner in terms of manufacturing, the respective guiding groove is formed by the channel-like exterior of a tongue of the tongue/groove guide element pair caused when the shaft is impressed. The control ring now forms a counter-stop for the pressure spring with respect to the supporting ring. Due to the installation of the locating sleeve over the at least one control cam, which is formed on the end facing away from the annular collar, the pressure spring is held indirectly on the locating sleeve. Due to its installation, the locating sleeve is held axially tightly to the control ring via the guiding grooves. Due to the formation of a control contour, preferably ramp-like or helical, the twisting of the locating sleeve to the locking position after reaching the undercut is simplified. The further the control cam of the locating sleeve approaches the supporting ring on the ramped route, the more the pressure spring is released and the smoother the rotational movement is until the pins of the supporting ring snap into the openings. Due to the progressive release, the severity of the snapping-in is alleviated, which improves the longevity of the cooperative components of the steering arrangement.

The control contour has two stops between which the control cam can be moved. Three identically configured control contours are preferably formed on the control ring, which adjoin one another and are loaded with a respective control cam. The control cams are formed on the interior of the locating sleeve and join up flush with the closing edge of the locating sleeve. As a result of this, the control contour of the control ring is covered by the locating sleeve. The stop that the locating sleeve adjoins when in the opening position is preferably formed to be longer than the other stop and serves as a display for the assembly position. In other words, a nose of the stop can be seen protruding beneath the locating sleeve when the locating sleeve is snapped onto the pin of the supporting ring and adjoins the other stop with its control cam. For the worker observing the interface between the steering coupling and the steering spindle only from the side of the fork crown, this also provides an optical response to indicate that the assembly has been carried out correctly. A further simplification of this response can exist in that the locating sleeve is provided with symbols or other markings on its exterior, which denote a locked position and an unlocked position. When there is covering with the nose of the stop, it is then completely clear to the worker, with the locking notification, that the assembly is complete and has been undertaken correctly.

In a preferred embodiment, the locating sleeve has at least one resilient clamping bracket protruding from the inner periphery of the sleeve and rising on the front side of the supporting ring on which the pressure spring is supported. During the driving operation and/or due to material defects, it is conceivable for the pressure spring, designed as a helical spring, to break. To prevent the locating sleeve from being released from its locked position as a result of vibrations caused by driving, the clamping bracket serves as a lock against axial movements resulting from the vibrations.

In a further preferred development of the invention, at least one shallow hollow is formed on the interior of the annular collar of the locating sleeve, which contains the contour of the pin of the supporting ring and into which the pin can be positioned. Transportation safety of the steering coupling with the connecting element is hereby guaranteed from the manufacturing facility to the installation site. Due to the shallow nature of the hollow, the worker can rotate the pin out of the hollow without a large amount of physical exertion; however, the hollow is in turn at such a depth that undesired twisting during delivery is prevented.

In a further, particularly preferred embodiment, the steering arrangement contains an additional allocation device for the grooves and tongues of the plug partners when there are several peripherally-displaced groove and tongue guide element pairs. Indeed, a clear allocation of the grooves and tongues is provided by the aforementioned, corresponding formation of the groove widths or the asymmetrical arrangement of the grooves or additional grooves. However, it can arise that, despite a mispositioning of the plug partners, a threading of the tongues into the grooves, and vice versa, is possible up to a specific degree, i.e. over a limited length. The worker, who is of course not able to completely carry out the threading motion, will attempt to de-thread the plug partners. Due to low clamping effects between the plug partners, this can occur in a particularly cumbersome manner, which takes up the worker's power, patience and time. To confront this potential defect, the steering arrangement is equipped with an allocation device. This device contains contour elements of different shapes, which are formed on the locating sleeve on the end facing away from the fork crown and protrude radially inwards. These are arranged with displacement to the projections and are, just like the projections, connected integrally to the locating sleeve. For example, the contour elements are convexities that are shaped to be more or less shallow.

Furthermore, the allocation device has an orientation pin arranged coaxially pre-assembled on the steering spindle end and possessing negatively-shaped contour elements on the periphery with respect to the contour elements of the locating sleeve. The diameter of the pin with its contour elements is smaller than the diameter of the internal width of the shaft, so that the pin can be pushed into the shaft and does not prevent the plug connection of both plug partners. The pin is dimensioned in such a way that, when inserting the pin into the locating sleeve, the contour elements of the locating sleeve and the pin engage with one another with clearance in compliance with the contours. In the case of mispositioning, an insertion is not possible. Thus, a clear allocation of the plug partners has already been undertaken before the plug connection is made. A cumbersome de-threading in the case of defects is no longer present in any way.

Finally, more contour elements are formed in the same radial position in the tongues of the steering spindle end behind the contour elements of the pin, so as not to prevent a further insertion movement when there is correct positioning between the contour elements of the pin and the sleeve. Here, the contour elements in the tongues are formed in such a way that they can pass by the locating sleeve with clearance to the contour elements.

In a particularly preferred development, the steering arrangement has a plug that is pressed into the end of the hollow steering spindle and seals it tightly. Penetration of dirt and corrosive media into the steering spindle is hereby prevented. In addition, it serves as protection against noises from the further steering train and the engine bay. When embodied practically, the plug is connected integrally to the orientation pin. The plug can thus consist of an elastomer, plastic or an elastic rubber material.

These and other advantages are demonstrated by the description below with reference to the accompanying figures. The reference to the figures in the description serves to support the description and to facilitate understanding of the subject matter. Subject matters or parts of subject matters that are essentially the same or similar can have the same reference numerals added to them. The figures are only a schematic depiction of an embodiment of the invention.

BRIEF DESCRIPTION OF THE DRAWING FIGURES

Figure 2:
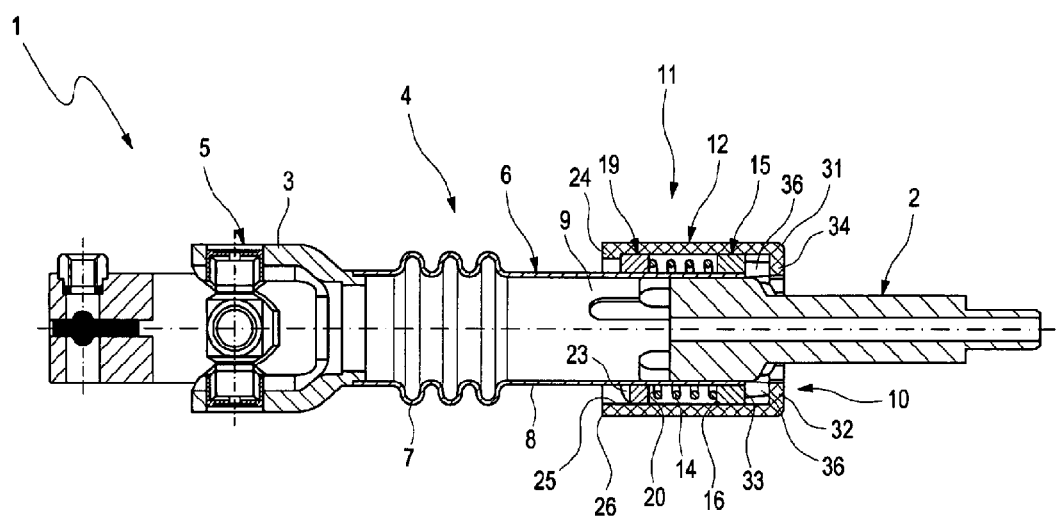
Figure 3:
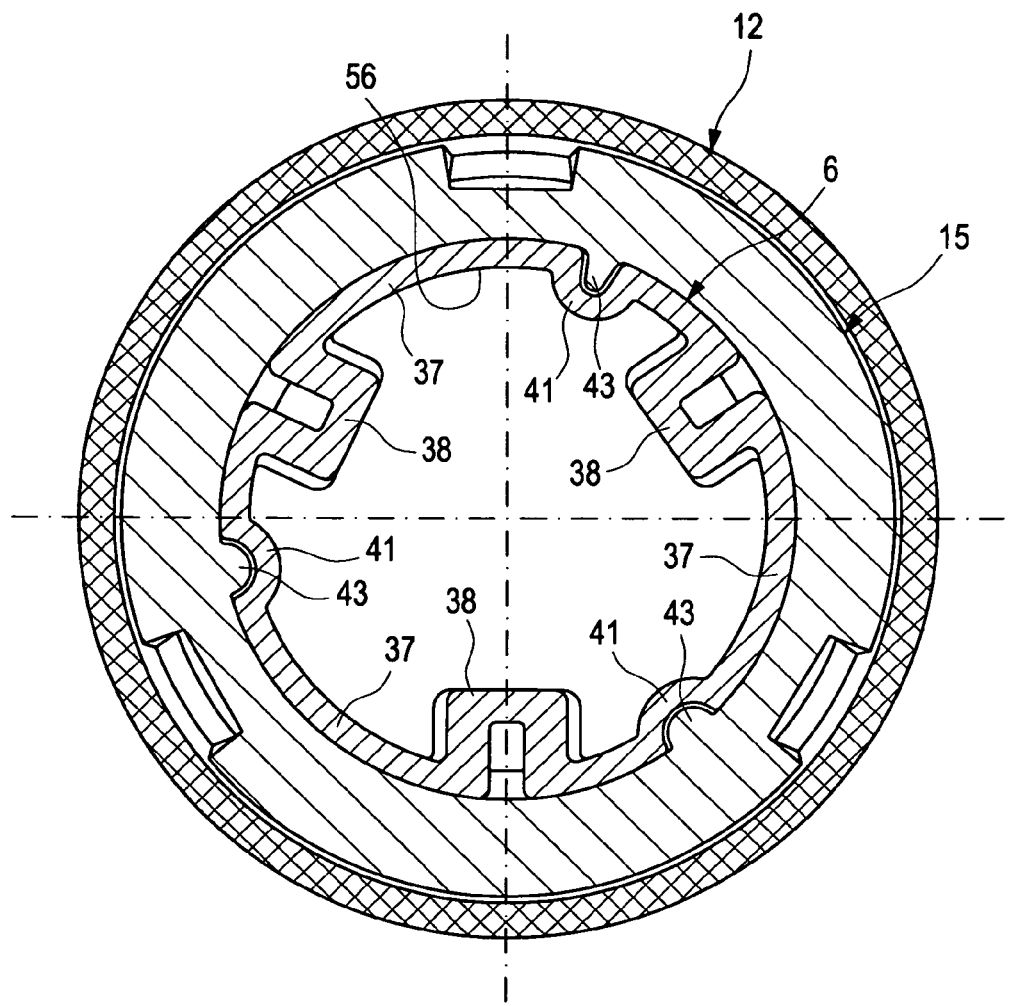
Figure 4:
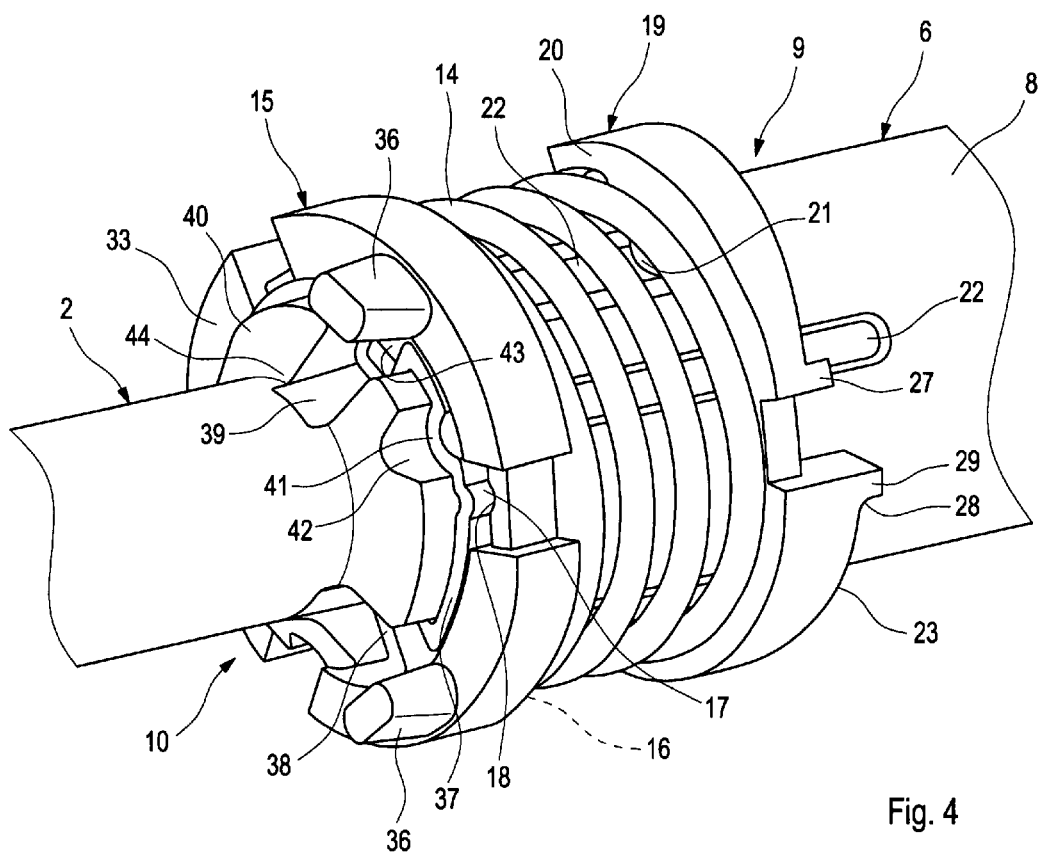
Figure 5:
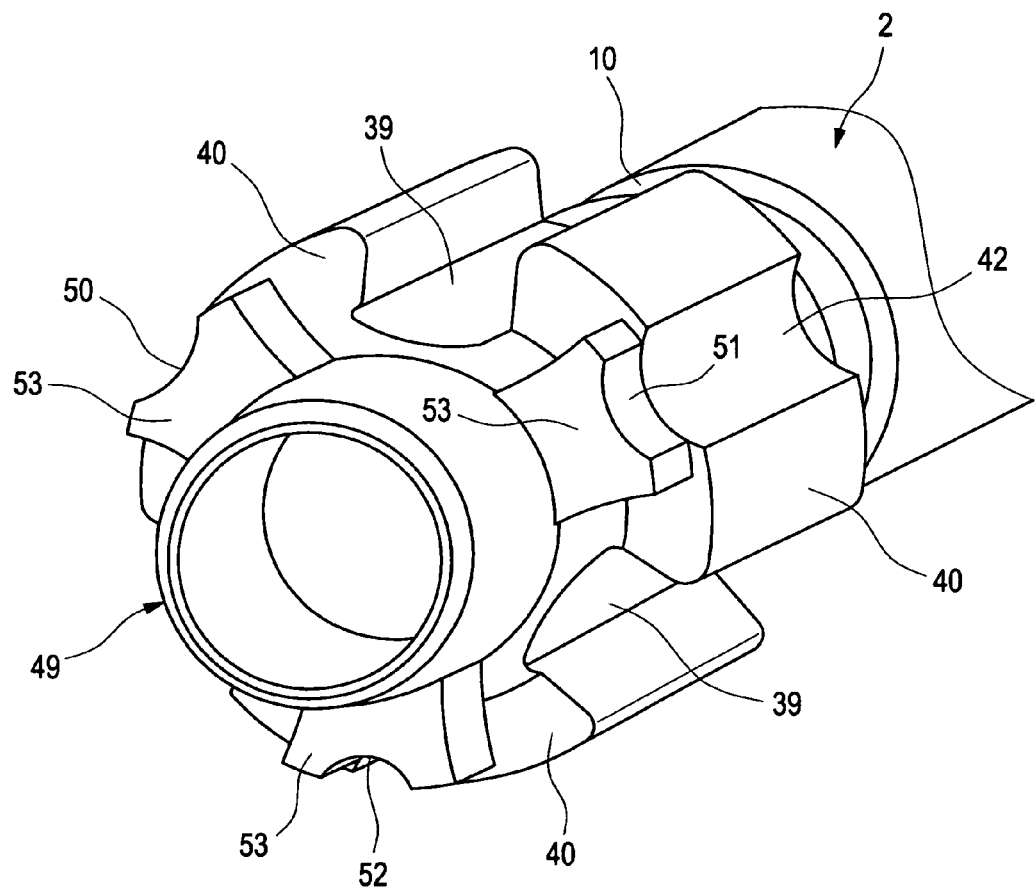
Figure 6:
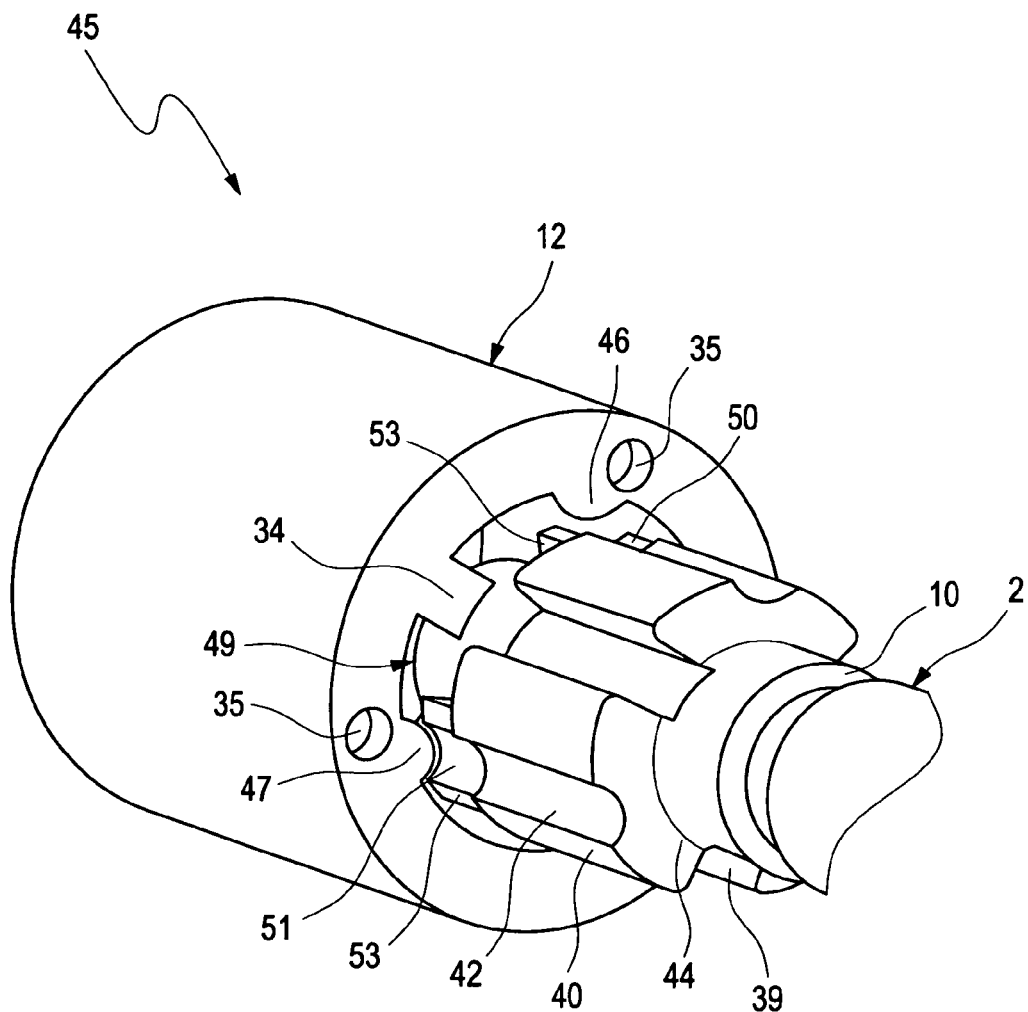
Figure 7:
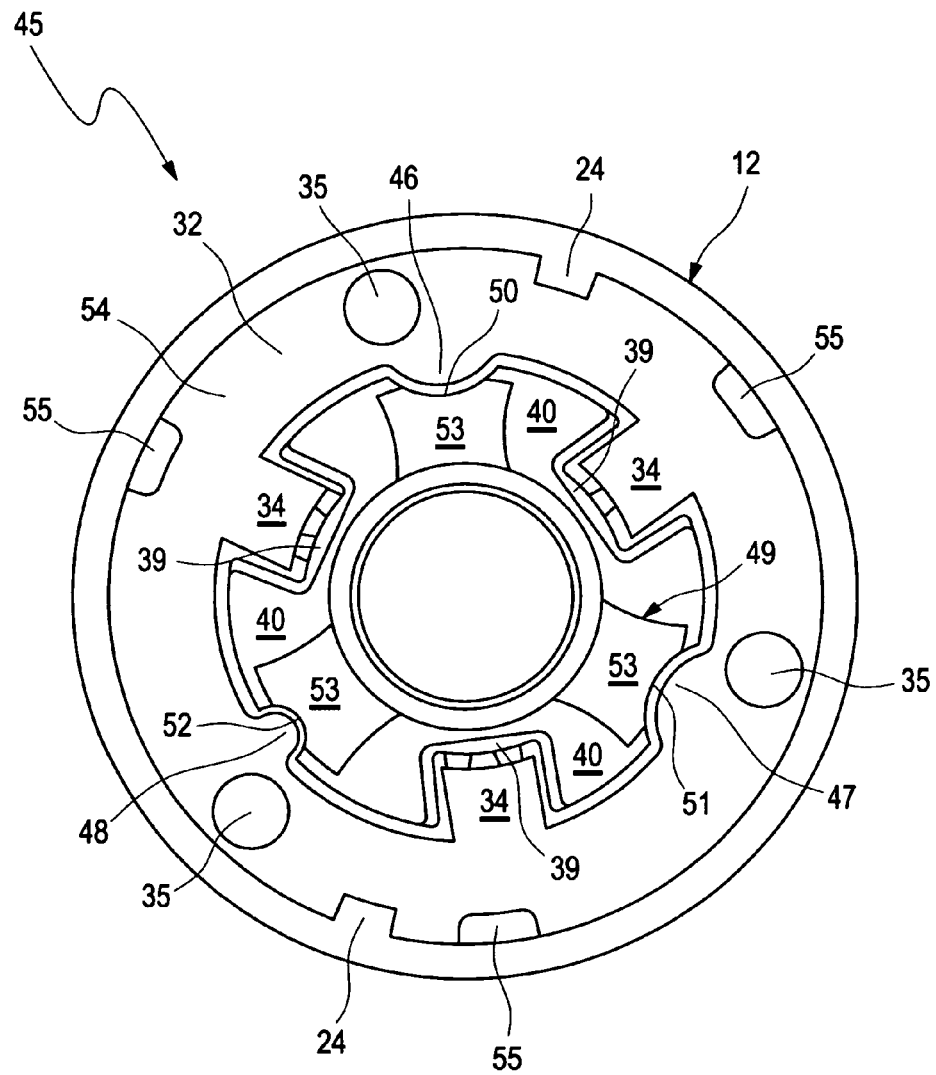

Here are shown:

FIG. 1 In a perspective view, a steering arrangement in the assembly according to the invention, FIG. 2 In a lateral longitudinal section, the steering arrangement from FIG. 1, FIG. 3 In a cross-section, the connecting element of the steering coupling of a steering arrangement according to the invention without a plug connection with a steering spindle, FIG. 4 In a perspective depiction, a section of a steering arrangement according to the invention in assembly without a locating sleeve, FIG. 5 In a perspective view, the steering spindle end of a steering arrangement according to the invention having an allocation device, FIG. 6 In a perspective view, the allocation device from FIG. 5 during threading into a locating sleeve of the steering arrangement, FIG. 7 In a frontal view from the underside of the locating sleeve, the threading process from FIG. 6.

DETAILED DESCRIPTION

FIG. 1 depicts an assembled steering arrangement 1 having a steering spindle 2 and a steering coupling 4 provided with a fork crown 3. The fork crown 3 is a component of a universal joint 5 connecting the steering arrangement 1 to a steering gear. A hollow shaft 6 is connected to the fork crown 3 on the other side, which is connected to the fork crown 3 by means of laser welding and which has a corrugated tube section 7. Subsequently, an elongated, cylindrical section 8 of the shaft 6 is connected to the corrugated tube section 7. The shaft 6 can be a casting or a reshaped hollow profile, yet one that is preferably metallic.

The cylindrical section 8 of the shaft 6 bears a connecting element 9, by means of which an end 10 of the steering spindle 2 is connected to the steering coupling 4 in the form of a plug connection. The shaft 6 furthermore bears a clamping device 11, which, among other things, contains a locating sleeve 12, which coaxially encloses the shaft 6 and is arranged there rotatably and moveably. The plug partners—steering spindle end 10 and connecting element 9—are clamped against each other in the plugging position by means of the clamping device 11, so that they cannot come loose.

The locating sleeve 12 has, on its external periphery, a knurling 13 for the simplified handling of the operation of the locating sleeve. As can be seen specifically in FIGS. 2 and 4, the clamping device 11 contains a pressure spring 14 in the form of a helical spring and a supporting ring 15. The supporting ring 15 is tightly connected to the shaft 6 and forms, with its side 16 facing away from the plugging direction of the steering spindle 2, a stop for the pressure spring 14, which is continuously supported here. The fixed connection stems from an expansion of the hollow shaft 6, which causes a press fit of the supporting ring 15, and from embossings 17 of the shaft 6, which are pressed into recesses 18 of the supporting ring 15 and ensure a positive fit.

The clamping device 11 additionally contains a control ring 19, which adjoins the pressure spring 14 located opposite the supporting ring 15 with a front side 20, and forms the counter-stop to the supporting ring 15 for this. The control ring 19 has, on its interior periphery, guiding pins 21 (FIG. 4), which engage with axially running guiding grooves 22 molded on the external periphery of the connecting element 9. The control ring 19 has, on its front side facing away from the supporting ring 15, three ramp-like control contours 23, which the locating sleeve 12 adjoins with a respective control cam 24. Here, the locating sleeve 12 engages behind the supporting ring 15 and the pressure spring 14 with the control cams 24 (FIG. 2), which are molded on the interior 25 of the locating sleeve 12 and join up flush with their closing edge 26 facing the fork crown 3.

The respective control contour 23 has two stops 27, 28 between which the control cam 24 can be moved. The stop 28, which the locating sleeve 12 adjoins in the opening position, is designed to be longer than the other stop 27 and serves as a display for the assembly position, wherein a nose 29 of the stop 28 can be seen when the assembly has been correctly performed. In this case, the locating sleeve 12 adjoins the other stop 27 with its control cams 24. For the unequivocal detection of the assembly state, the locating sleeve 12 is marked with locking symbols 30 a, b (lock open 30a or closed 30b) on the outside (FIG. 1), wherein, in the locked position, the "lock closed" symbol 30b includes the same radial position as the nose 29 of the stop 28.

The locating sleeve 12 has, on its other end 31, an annular collar 32 extruding inwards, which encloses the supporting ring 15 as a cover on the front side 33 facing away from the pressure spring 14. Three gear-like projections 34, which point radially inwards, protrude from the annular collar 32, which are displaced at 120° with respect to one another in the peripheral direction. Three oval openings 35 are formed in the annular collar 32 with 45° displacement from the projections 34 in the peripheral direction (see FIG. 1 in particular). These correspond to three pins 36 (FIG. 4), which are formed on the front side 33 of the supporting ring 15 facing away from the pressure spring 14 and protrude axially.

To form the plug connection, the steering spindle end 2 and the connecting element 9 are equipped with three respective tongue and groove guide element pairs 37, 38 and 39, 40 on the ends facing each other, which pairs provide a torque-transmitting priority control and coaxial plug partners. As is illustrated in particular in FIG. 3, the grooves 37 and the tongues 38 are molded on the interior 56 of the shaft 6 and are displaced at 120° from each other on the internal peripheral side, wherein the grooves 37 are engaged by the tongues 38. The grooves 37 and tongues 38 are designed with different widths and have a tapered shape, wherein the groove 37 tapers in the longitudinal axial direction towards the side facing away from the plug partner, and the tongue 38 tapers in the longitudinal axial direction towards the side facing the plug partner. The width and shape are adjusted to the corresponding grooves 39 and tongues 40, which are formed on the external periphery of the end 10 of the steering spindle 2. Thus, a clear allocation of the relative position of the steering spindle 2 with respect to the steering coupling 4 is created in order to correctly implement a plug connection.

In addition, the shaft 6 of the steering coupling 4 has further convexities 41 with different levels of curvature, which are adjusted to negatively shaped allocation grooves 42 that are molded into the tongues 40 of the steering spindle end 10. The allocation between the plug partners is hereby improved yet further and the safety of a correct assembly is increased by assuming the provided relative position of the plug partners with respect to each other.

The convexities 41 of the shaft 6 can be used as guiding grooves 22. Furthermore, for a safe assembly of the supporting ring 15 on the shaft 6, it is possible to provide a fixing pin 43 on the inner periphery of the supporting ring 15, which engages with one of the grooves 37. The fixing pin 43 serves, in the same way as orientation, for the assumption of the predetermined rotational position of the supporting ring 15 on the shaft 6 relative to the fork crown 3.

The width of the respective projection 34 of the locating sleeve 12 corresponds to that of the groove 39 of the steering spindle end 10 as if it is held securely in the groove 39. The steering spindle end 10 is incidentally formed with an undercut 44, which the groove 39 of the steering spindle end 10 adjoins. Here, the undercut 44 is an extensive, conical, rounded tapering, which forms the transition of the tongue/groove section into the smooth cylindrical part of the steering spindle 2.

To achieve a connection between the steering spindle 2 and the steering coupling 4 that cannot come loose, these are first plugged together according to the grooves and tongues 37, 38 and 39, 40 allocated to one another, as well as the convexities 41 and allocation grooves 42 in the correct relative position, wherein the end 10 of the steering spindle 2 is threaded through the locating sleeve 12 on the projections 34 thereof. As such, the locating sleeve 12 is then raised in the direction of the steering spindle 2, wherein the projections 34 slide along inside the grooves 39 of the steering spindle 2. When the undercut 44 has been reached, the locating sleeve 12 is rotated, wherein the control cams 24 thereof are moved along the control contours 23. The rotation is carried out until the openings 35 of the annular collar 32 of the locating sleeve 12 have reached the pins 36 of the supporting ring 15 and these are immersed into the openings 35. Since the pressure springs 14 are partially relaxed, the locating sleeve 12 snaps onto the supporting ring 15. Then, due to the relative rotational position of the projections 34 with respect to the openings 35 or the pins 36, the locating sleeve 12 is hereby secured, wherein the projections 34 come to lie behind a respective tongue 40 of the steering spindle end 10. As a consequence of the clamping of both plug partners obtained in this way, the wedges of the grooves and tongues 37, 38, 39, 40 are pushed together, whereby a wedge clamping is triggered that binds the plug partners particularly tightly to each other.

The locating sleeve 12 incidentally still has at least one resilient clamping bracket (not depicted here) protruding at an angle from the inner periphery of the sleeve 12 and, in the locked state, rises on the front side 16 of the supporting ring 15 on which the pressure spring 14 is supported.

The steering arrangement furthermore contains an additional allocation device 45, as is depicted in FIGS. 5-7. This device 45 contains three contour elements 46, 47, 48 of different convex shapes, which are formed on the locating sleeve 12 on the end facing away from the fork crown 3 and protrude radially inwards. These are arranged with displacement in the peripheral direction to the projections 34 and are, just like the projections 34, connected integrally to the locating sleeve 12.

The allocation device 45 additionally contains an orientation pin 49, which is arranged coaxially pre-assembled on the steering spindle end 10 and possesses negatively-shaped contour elements 50-52 on the periphery with respect to the contour elements 46-48 of the locating sleeve 12. In this particular case, radially separated webs 53 are formed on the external periphery of the hollow cylindrical pin 49 in the form of windmill vanes, which bear the contour elements 50-52 in the form of concavities on their free ends. The diameter of the pin 49 with its contour elements 50-52 is smaller than the diameter of the internal width of the shaft 6, so that the pin 49 can be pushed into the shaft 6 and does not prevent the plug connection of both plug partners. The dimensions of the pin 49 are such that, during insertion into the locating sleeve 12, the contour elements 46-48 of the locating sleeve 12 and the contour elements 50-52 of the pin 49 engage with one another with clearance in compliance with the contours.

Finally, contour elements in the tongues 40 of the steering spindle end 10 are still formed in the same radial position behind the contour elements 50-52 of the pin 49. Here, the contour elements in the tongues 40 are formed in such a way that they can pass by the locating sleeve 12 with clearance to the contour elements 46-48, when the radial relative positions match each other. The contour elements that are formed in the tongues 40 of the steering spindle end 10 correspond to the contour elements 50-52 of the pin 49 in terms of shape and cross-section and are arranged in alignment therewith. The contour elements of the tongues 40 can incidentally comply with the allocation grooves 42 (FIG. 4).

The pin 49 forms a plug that tightly seals the end 10 of the hollow steering spindle 2. Finally, as can be appreciated from FIG. 7, three shallow hollows 55 are formed on the interior 54 of the annular collar 32, which have the contour of the pin 36 of the supporting ring 15 and into which the pins 36 can be positioned. Thus, a rotation of the locating sleeve 12 is only possible under considerable force, whereby transportation safety is implemented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A steering arrangement, comprising:
   a steering spindle; and
   a steering coupling provided with a fork crown bearing a connecting element, by means of which an end of the steering spindle is connected to the steering coupling in a plug connection,
   wherein the steering spindle end and the connecting element are formed as coaxial plug partners on ends facing each other by means of at least one tongue and groove guide element pair that provides a torque-transmitting priority control,
   wherein the connecting element forms a hollow shaft of the steering coupling, wherein the at least one groove or the at least one tongue of the guide element pair is molded on an interior of the shaft,
   wherein the steering arrangement contains a clamping device, by means of which the plug partners are clamped against each other in a plugging position so that they cannot come loose,
   wherein the shaft of the steering coupling bears the clamping device, which contains a locating sleeve, a pressure spring and a supporting ring,
   wherein the supporting ring is tightly connected to the shaft and the pressure spring adjoins a side of the supporting ring located on a side facing away from the plugging direction of the steering spindle, wherein the locating sleeve engages behind the supporting ring and the pressure spring and the locating sleeve is rotatably and moveably arranged on the shaft, wherein the locating sleeve has at least one projection pointing radially inwards or one groove on an end facing away from the pressure spring, which projection corresponds in terms of width with the groove or which corresponds with the tongue of the steering spindle end, and wherein an undercut is formed on the steering spindle end, which the at least one groove or the at least one tongue of the steering spindle end adjoins.

2. The steering arrangement according to claim 1, wherein the steering spindle end and the connecting element have several tongue and groove guide element pairs displaced peripherally, and wherein the several tongue and groove guide element pairs have different widths or are distributed asymmetrically over a periphery of the steering spindle end and the connecting element.

3. The steering arrangement according to claim 1, wherein
the locating sleeve has an annular collar on one end, which extrudes inwards and which encloses the supporting ring as a cover on a side facing away from the pressure spring, and from which the at least one projection protrudes radially inwards from the annular collar, at least one opening is formed in the annular collar, and the supporting ring has at least one pin on its front side facing away from the pressure spring, which is arranged in the covered region and corresponds to the at least one opening.

4. The steering arrangement according to claim 1, wherein the clamping device contains a control ring adjoining the pressure spring opposite the supporting ring and which has at least one ramp-like control contour on a front side facing away from the supporting ring, which the locating sleeve adjoins with a control cam, and the shaft has at least one axially running guiding groove on its outside, with which the control ring engages with a guiding pin formed on an interior periphery of the control ring.

5. The steering arrangement according to claim 1, wherein the steering spindle end and the connecting element have several tongue and groove guide element pairs, the steering arrangement further comprising:

an allocation device comprising first contour elements of different shapes formed on the locating sleeve on the end facing away from the fork crown and protruding radially inwards, an orientation pin arranged coaxially pre-assembled on the steering spindle end and possessing negatively-shaped contour elements protruding radially outwards towards the first contour elements of the locating sleeve, wherein a diameter of the orientation pin, with the negatively-shaped contour elements, is smaller than a diameter of an internal width of the shaft, second contour elements formed in the tongues of the steering spindle end, wherein the second contour elements have a same shape and same cross-sectional size as the negatively-shaped contour elements of the pin and are arranged in alignment thereto.

6. The steering arrangement according to claim 1, further comprising:

a plug tightly sealing the steering spindle end of the hollow steering spindle.

7. The steering arrangement according to claim 1, wherein the groove and tongue of the at least one tongue and groove guide element pair has a tapered shape, wherein the groove tapers in a longitudinal axial direction towards the side facing away from the plug partner, and the tongue tapers in the longitudinal axial direction towards the side facing the plug partner.

8. The steering arrangement according to claim 1, wherein the locating sleeve has at least one resilient clamping bracket, which protrudes at an angle from the interior periphery of the sleeve and rises, in a locked state, on the front side of the supporting ring on which the pressure spring is supported.

9. The steering arrangement according to claim 3, wherein at least one shallow hollow is formed on an interior of the annular collar, which has the contour of a pin of the supporting ring and into which the pin can be positioned.

* * * * *